United States Patent
Schatzberg et al.

(10) Patent No.: US 9,654,912 B2
(45) Date of Patent: May 16, 2017

(54) WIRELESS TIME OF FLIGHT SECURITY, USER AUTHENTICATION, AND VARIABLE QOS POSITION ACCURACY PROTOCOL

(71) Applicant: INTEL CORPORATION, Santa Clara, CA (US)

(72) Inventors: Uri Schatzberg, Kiryat Ono (IL); Yuval Amizur, Kfar-Saba (IL); Leor Banin, Petach Tikva (IL); Alexander Sasha Sirotkin, Hachadasha (IL)

(73) Assignee: INTEL CORPORATION, Santa Clara, CA (US)

( * ) Notice: Subject to any disclaimer, the term of this patent is extended or adjusted under 35 U.S.C. 154(b) by 1239 days.

(21) Appl. No.: 13/625,570

(22) Filed: Sep. 24, 2012

(65) Prior Publication Data

US 2016/0157099 A1     Jun. 2, 2016

(51) Int. Cl.
*G01S 3/02*          (2006.01)
*H04W 4/02*       (2009.01)
(Continued)

(52) U.S. Cl.
CPC ............ *H04W 4/02* (2013.01); *G01S 5/0054* (2013.01); *H04W 12/08* (2013.01); *H04W 48/20* (2013.01);
(Continued)

(58) Field of Classification Search
CPC ....... H04W 4/02; H04W 4/025; H04W 48/04; H04W 48/16; H04W 48/20; H04W 8/205;
(Continued)

(56) References Cited

U.S. PATENT DOCUMENTS 6,757,545 B2 *   6/2004   Nowak ................... H04W 4/22
                                                           342/357.29
7,139,820 B1 *   11/2006   O'Toole, Jr. .......... H04L 63/123
                                                           701/468
(Continued)

OTHER PUBLICATIONS

International Preliminary Report on Patentability mailed Apr. 2, 2015 for corresponding International Patent Application No. PCT/US2013/047410 (7 pages).
(Continued)

*Primary Examiner* — Chuong P Nguyen
(74) *Attorney, Agent, or Firm* — Pillsbury Winthrop Shaw Pittman LLP

(57) ABSTRACT

Systems and methods are directed to securely identifying positioning information and include a plurality of APs configured to facilitate wireless communications within a servicing area, an infrastructure entity, communicatively coupled to each of the APs, and configured to store and process subscription information, positioning information, QoS information indicative of resolution levels of the positioning information, and encryption/decryption information specific to each of a plurality of subscribing member wireless devices. As a wireless device enters the servicing area, the wireless device establishes a first level of communication with the infrastructure entity via at least one AP, and requests positioning information to the at least one AP which is then forwarded to the infrastructure entity. Upon verifying that the wireless device is a subscribing member, a second level of communication is established that securely provides position information to the wireless device, based on the encryption/decryption information specific to the wireless device.

20 Claims, 2 Drawing Sheets

(51) Int. Cl.
  *H04W 48/20* (2009.01)
  *G01S 5/00* (2006.01)
  *H04W 12/08* (2009.01)
  *H04W 64/00* (2009.01)
  *H04W 12/02* (2009.01)
  *H04W 12/06* (2009.01)
  *H04L 29/06* (2006.01)
  *H04W 8/20* (2009.01)

(52) U.S. Cl.
  CPC ......... *H04W 64/00* (2013.01); *H04L 63/0428* (2013.01); *H04W 8/205* (2013.01); *H04W 12/02* (2013.01); *H04W 12/06* (2013.01)

(58) Field of Classification Search
  CPC ......... H04W 12/08; H04W 64/00; G01S 5/04; G01S 5/0242; G01S 5/0054
  USPC ........................................ 342/457, 450, 451
  See application file for complete search history.

(56) References Cited

U.S. PATENT DOCUMENTS

| | | | |
|---|---|---|---|
| 7,177,295 B1 | 2/2007 | Sholander et al. | |
| 7,489,240 B2* | 2/2009 | Soliman | G01S 1/68 340/539.12 |
| 8,644,506 B2* | 2/2014 | Zellner | H04L 41/12 380/249 |
| 8,713,646 B2* | 4/2014 | Stuntebeck | H04L 67/16 713/150 |
| 8,831,565 B2* | 9/2014 | Karaoguz | H04W 4/02 370/331 |
| 2003/0216143 A1* | 11/2003 | Roese | G01S 5/02 455/456.1 |
| 2009/0061870 A1* | 3/2009 | Finkelstein | H04W 48/20 455/435.2 |
| 2012/0280812 A1* | 11/2012 | Sheikman | G01S 13/876 340/539.13 |

OTHER PUBLICATIONS

International Search Report and Written Opinion, PCT/ISA/210, PCT/ISA/220, and PCT/ISA/237, mail date Aug. 30, 2013, total of 10 pages.

Baoxian Zhang et al., OoS Routing for Wireless Ad Hoc Networks: Problems, Algorithms, and Protocols, Topics in Ad Hoc and Sensor Networks, IEEE Communications Magazine, Oct. 2005, pp. 110-117.

International Search Report and Written Opinion mailed Aug. 30, 2013 for corresponding International Patent Application No. PCT/US2013/047410 (10 pages).

* cited by examiner

WIRELESS TIME OF FLIGHT SECURITY, USER AUTHENTICATION, AND VARIABLE QOS POSITION ACCURACY PROTOCOL

TECHNICAL FIELD

This disclosure relates generally to the field of wireless communications, and in particular, to wireless navigation systems and methods.

BACKGROUND ART

Outdoor navigation has been widely deployed, given the development of various global-navigation-satellite-systems (GNSS). However, such navigation systems do not work well for indoor applications, as indoor environments do not facilitate the effective reception of signals from GNSS satellites.

Indoor navigation systems have been recently developed that are based on wireless networks, such as, for example, Wi-Fi. However, these indoor navigation systems may be susceptible to security issues. Moreover, as such systems become more popular and/or widespread, the potential for abuse and malicious attacks will increase

DETAILED DESCRIPTION

Figure 1:
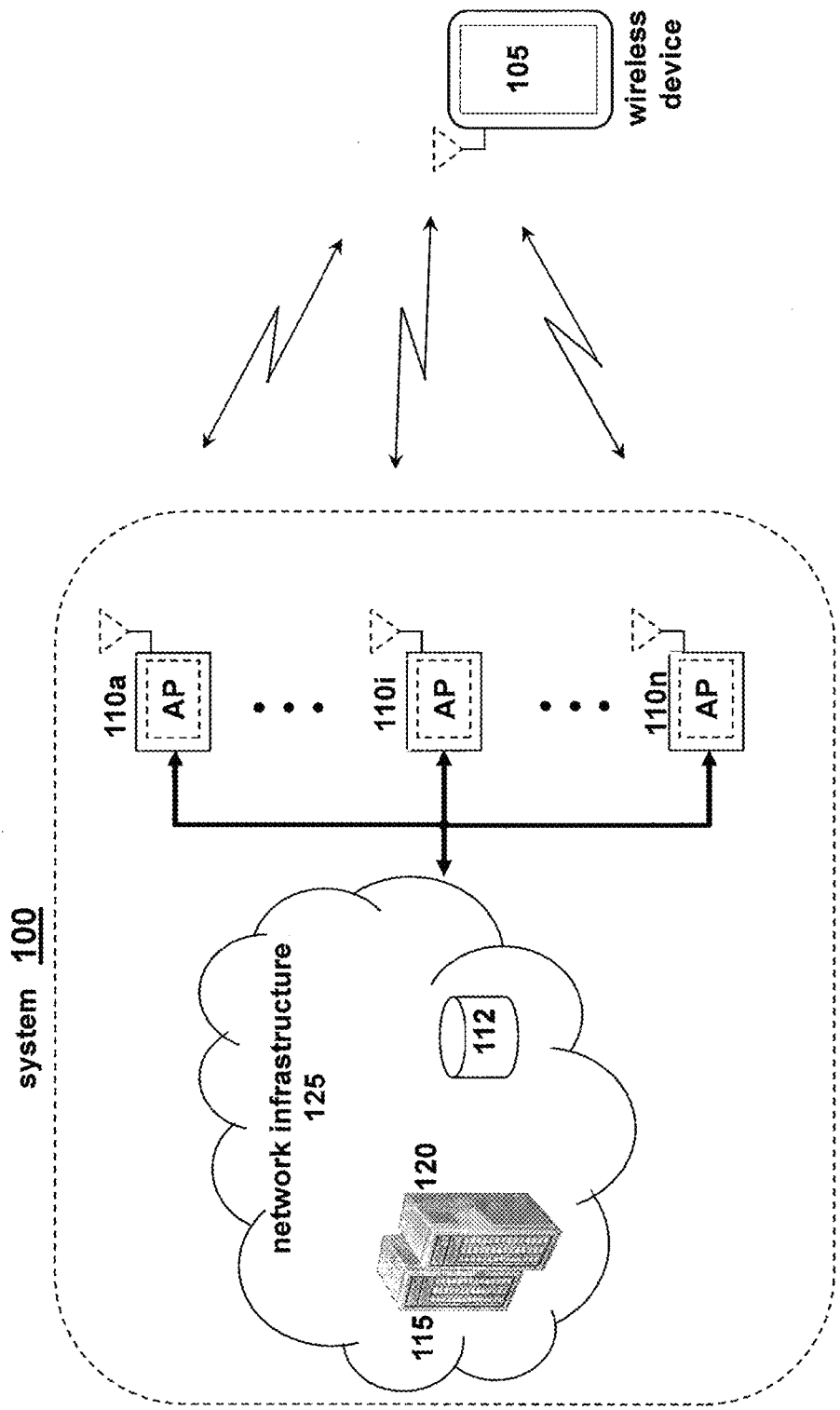
FIG. 1 depicts a functional block diagram of a secure wireless position identification system, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is a wireless system that securely identifies positioning information. The secure wireless system includes a plurality of APs configured to facilitate wireless communications within a servicing area, an infrastructure entity, communicatively coupled to each of the APs, and configured to store and process subscription information, positioning information, QoS information indicative of resolution levels of the positioning information, and encryption/decryption information specific to each of a plurality of subscribing member wireless devices. As a wireless device enters the servicing area, the wireless device establishes a first level of communication with the infrastructure entity via at least one AP, and requests positioning information to the at least one AP which is then forwarded to the infrastructure entity. Upon verifying that the wireless device is a subscribing member, a second level of communication is established that securely provides position information to the wireless device, based on the encryption/decryption information specific to the wireless device.

In another embodiment, a method is presented that securely identifies positioning information in a wireless system. The method including storing, by an infrastructure entity, subscription information, positioning information, quality of service (QoS) information indicative of resolution levels of the positioning information, and encryption/decryption information specific to each of a plurality of subscribing member wireless devices, establishing a first level of communication with the infrastructure entity via at least one AP, by a wireless device entering the servicing area and requesting, by the wireless device, positioning information to the at least one AP. In turn, receiving, by the infrastructure entity, the positioning information request from the at least one AP, and processing, by the infrastructure entity, the positioning information request to verify that the wireless device is one of the subscribing member wireless devices. And upon verifying that the wireless device is one of the subscribing member wireless devices, establishing a second level of communication that securely provides position information at the corresponding QoS level of resolution to the wireless device, based on the encryption/decryption information specific to the wireless device.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

For indoor navigation systems, the inventors have observed that the majority of the implementations do not provide robust security features that are capable of protecting both the user and the service provider. As such, what is proposed is a secure positioning system and method that ensures that positioning information, operating in indoor and well as outdoor environments, is received from a trusted service provider as well as prevent unauthorized users from acquiring positioning services. Moreover, the secure positioning system and method will also facilitate the delivery of quality-of-service (QoS)-based degrees of positioning information accuracy/resolution, based on user subscription or other criteria.

With this said, FIG. 1 depicts a non-limiting example of secure wireless position identification system 100, in accordance with various aspects and principles of the present disclosure. Secure position identification system 100 may be managed and administered by a service provider entity that wirelessly provides positioning information/services, including indoor positioning information, to wireless device users that are permitted to use such services based on a subscription or other agreement with the service provider.

The positioning information provided by secure position identification system 100 may be based on Time-of-flight (ToF) techniques. In general, ToF techniques measure the overall interval of time taken for a signal that propagates from a wireless device to a network access point (AP) and from the AP back to the wireless device. The overall time interval may be converted into a round-trip distance by multiplying it by the speed of light. The one-way distance between the wireless device and the AP may be calculated by dividing the round-trip distance by two. So, a wireless device may request ToF positioning to several APs (e.g., three APs) and because the exact positions of the APs are known and the one-way distances between the wireless device and the APs may be determined via ToF techniques, location estimation techniques, such as, trilateration or other similar techniques, may be used to converge on the location of wireless device. The accuracy or resolution of the wireless device location may then be refined by employing a variety of additional techniques.

The architecture of secure position identification system 100 comprises a plurality of network access points (APs) 110a-110n that are communicatively coupled to network infrastructure entity 125, which includes at least database 112, authentication server 115, positioning information server 120, and/or a combination of these components. The components of network infrastructure entity 125 may individually or in combination, store and process relevant data such as, for example, whether device 105 is a registered subscriber to the secure positioning services provided by system 100, whether device 105 has satisfied the subscription criteria, whether device 105 is current on subscription payments, what level of QoS accuracy is wireless device 105 entitled to, encryption/decryption key information, etc.

APs 110a-110n are, therefore, configured to belong to the same authentication domain and may exchange and share authentication, positioning, administration, and supervisory information with each other, as furnished by authentication server 115 and positioning information server 120. Moreover, in certain embodiments, APs 110a-110n may be configured with a neighbor list mechanism that includes relevant information regarding all neighboring APs in system 100.

The terms "network access points," "access points" and "APs" refer to any device with the ability to receive wireless signals from one or more devices and provides access to a network, such as a local area network (LAN) or the Internet, for example. An AP may be installed at a fixed terrestrial location or may be installed on a vehicle or mobile apparatus. As such, an AP may comprise antenna(s), radio-frequency transmitter(s)/receiver(s), processor(s), router functionality, etc.

Moreover, as used herein, the term "network" refers to a wireless communication network that may be utilized in example implementations as discussed below. The network may be configured to operate under a variety of wireless communication protocols and standards, such as, for example, Wi-Fi, WiMax, WWAN, WLAN, WPAN, Bluetooth, GSM, CDMA, GPRS, 3G or 4G, LTE, Wireless USB, the IEEE 802.11x standard, such as IEEE std. 802.11k-2008 published Jun. 12, 2008, or IEEE std. 802.11-2012 published Mar. 29, 2012, or any other implementation of a suitable wireless standard. As such, wireless communications is not limited to any specific standard and the examples discussed may be implemented separately or in combination with each other.

It will be appreciated that network infrastructure 125 and associated protocols described herein are not limiting, as numerous architectures and protocols/standards may be used without departing from the scope of the various aspects and principles of the present disclosure. For example, the locations of authentication server 115 and positioning information server 120 is not limiting as they may reside local to the areas being serviced or remotely as part of a global managing entity.

Similarly, the protocols under which APs 110a-110n use to exchange and share authentication information and positioning information is also not limiting, as numerous protocols may be used. For example, in certain embodiments, the infrastructure may refer to a set of Wireless Termination Points (WTP) managed by an Access Controller (AC), as defined by the Control and Provisioning of Wireless Access Points Protocol (CAPWAP), in which positioning and authentication may be implemented by the AC. In other embodiments, the infrastructure may refer to a similar architecture as defined by the Lightweight Access Point Protocol (LAWPP).

Returning to FIG. 1, wireless device 105 enters a new area, namely, the area serviced by secure position identification system 100, and is in need of positioning information, such as, for example, indoor positioning information. It will be appreciated that providing indoor positioning is not limiting, in any way, to the principles and operations disclosed herein, as system 100 may equally provide outdoor positioning information as well.

As used herein, the term "wireless device" refers to any device that may communicate with other devices via wireless signals. Such devices may comprise, for example, a laptop, mobile device, cellular/smartphone, gaming device, tablet computer, a wireless-enabled patient monitoring device, personal communication system (PCS) device, personal digital assistant (PDA), personal audio device (PAD), portable navigational device, and/or any other electronic wireless-enabled device configured to receive a wireless signal. It may also include relatively stationary devices such as desktop computers with wireless capabilities. Such wireless devices may communicate via any number of wireless communication protocols, examples of which are described below.

By way of example only, and in no way limiting, secure position identification system 100 may be implemented in accordance with WiFi specifications, such as, for example, IEEE Standard 802.11k-2008 or IEEE Standard 802.11-2012, or any combination thereof. Consistent with WiFi standards, as wireless device 105 enters the new area serviced by system 100, wireless device 105 may scan a wide frequency range to detect the RF beacon signals broadcasted by one or more of APs 110a-110n. Wireless device 105 may then determine to communicate with a particular AP, such as AP 110i, based on pre-specified operational criteria, such as, for example, AP 110i being the first AP that the device 105 encounters, AP 110i being the closest AP to device 105, AP 110i having the strongest signal, AP 110i being the least busy, etc.

Figure 2:
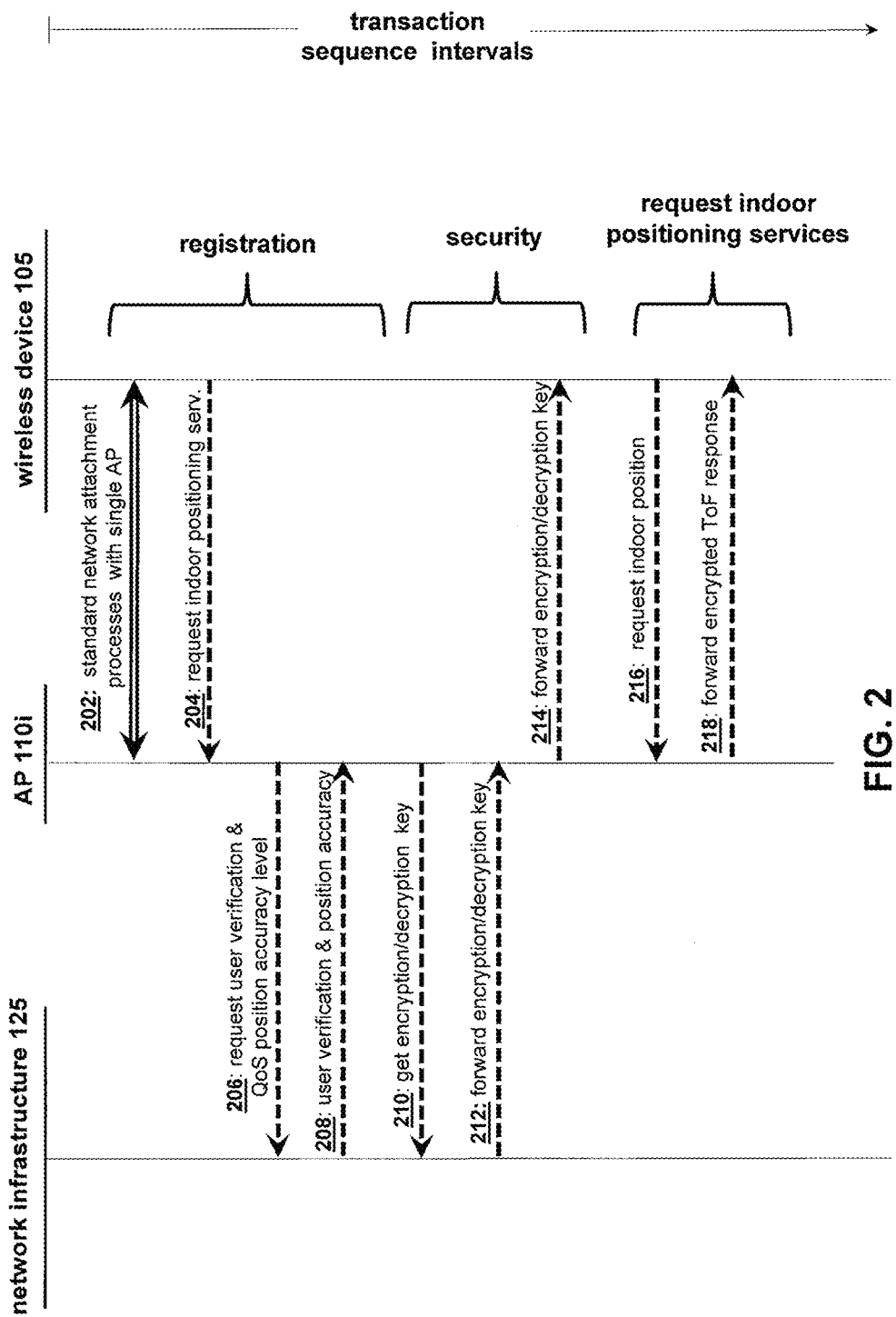
FIG. 2 depicts a message flow diagram illustrating an exemplary process for secure wireless position identification, in accordance with various aspects and principles of the present disclosure.

To securely provide the position information to wireless device 105, as well as identify the QoS-based degree of accuracy that wireless device 105 is entitled to, secure position identification system 100 is configured to operate under process 200, as depicted by FIG. 2, in accordance with various aspects and principles of the present disclosure. Process 200 is represented as a transactional message flow diagram illustrating transactional messages between wireless device 105, AP 110i, and network infrastructure 125.

As indicated by message 202, after its determination to communicate with AP 110i, wireless device 105 may then initiate a standard request to AP 110i to commence network attachment operations, which include association and authentication processes, as prescribed, for example, by IEEE Standard 802.11k-2008 or IEEE Standard 802.11-2012. Typically, this standard request will trigger a series of exchanges and transactional messages between AP 110i and wireless device 105, such as, for example, the request for wireless device 105 to provide its identity, the exchange of shared authentication security keys, the authentication processing of wireless device 105, the transmission of association request by wireless device 105, the processing of the association request, the registration of wireless device 105 to establish network connectivity, and the notification of network information and available services.

After the authentication/association/registration of wireless device 105 and the notification of information/available services that system 100 offers, wireless device 105 may transmit a request message for indoor positioning services, as indicated by message 204. AP 110i receives the request message from device 105 and then forwards a message of its own to network infrastructure 125, as indicated by message 206. The AP 110i message requests infrastructure 125 to verify whether wireless device 105 is permitted to receive such services and to what level of QoS accuracy is wireless device 105 entitled to.

Network infrastructure 125 receives message 206 and processes it by examining information relative to wireless device 105 as stored in database 112. For example, network infrastructure 125 may examine database 112 to determine whether device 105 is a registered subscriber to the secure positioning services provided by system 100, whether device 105 has satisfied the subscription criteria, whether device 105 is current on subscription payments, etc. Similarly, network infrastructure 125 may examine database 112 to confirm what level of QoS accuracy is wireless device 105 entitled to based on its subscription criteria or if its current location is in an area where positioning information and/or accuracy levels are limited or prohibited.

For example, in arrangements with the service providing entity that manages system 100, wireless device 105 user may have agreed to pay a more expensive monthly fee to subscribe to a higher QoS positioning accuracy level service, such as within a 1 meter radius, as opposed to a less expensive fee for a lower QoS accuracy level of a 10 meter radius. In another example, while wireless device 105 user has opted to pay for the higher QoS positioning accuracy level service, he may only receive a lower QoS accuracy level if he is in, or near, a secure military area.

After examining database 112, network infrastructure 125 returns a message to AP 110i indicating whether wireless device 105 is verified to receive such services as well as what QoS position accuracy level wireless device 105 is entitled to, as indicated by message 208.

Upon verifying that wireless device 105 is a valid, registered, subscriber entitled to a certain QoS level information based on its subscription agreement, AP 110i then requests encryption/decryption key information that is specific to wireless device 105 from network infrastructure 125, as indicated by message 210. If the encryption/decryption key information specific to wireless device 105 does not exist, such as in the case of wireless device 105 being a new subscriber, network infrastructure 125 will generate the encryption/decryption key information specific to wireless device 125.

In some embodiments, the encryption/decryption key information may be configured to be symmetric and may also be based on, or be a variant of, the 802.11 standard encryption/decryption key information used for the initial authentication process. The encryption/decryption key information specific to wireless device 105 will be used by AP 110i, as well as all neighboring APs, to encrypt any subsequent related information that is communicated to wireless device 105 and used by wireless device 105 to decrypt such information received by all neighboring APs of system 100.

By implementing encryption/decryption key information specific to wireless device 105 that will be used to protect communications between AP 110i and its neighboring APs and wireless device 105, system 100 effectively prevents any unauthorized wireless device from illicitly acquiring positioning services. Along similar lines, such implementation will also ensure that authorized, registered wireless devices equipped with the encryption/decryption key information receive legitimate positioning information from a trusted service providing entity.

Returning to FIG. 2, network infrastructure 125 forwards the specific encryption/decryption key information to AP 110i, as indicated by message 212. In addition, network infrastructure 125 may forward the specific encryption/decryption key information to AP 110i and all relevant or neighboring APs. For example, in some embodiments, as part of the management functionality of system 100, network infrastructure 125 may forward the encryption/decryption key information to AP 110i as well as to its neighboring APs. In other embodiments, may be achieved by network infrastructure 125, which is in communication with all APs. Upon receiving the encryption/decryption key information from network infrastructure 125, AP 110i forwards the encryption/decryption key information to its neighboring APs by virtue of referring to its neighbor list mechanism which includes attributes and information regarding each of the neighboring APs within system 100.

As indicated by message 214, AP 110i (or any of the neighboring APs), forwards the encryption/decryption key information to wireless device 105. And, upon receiving encryption/decryption key information, wireless device 105 seeking to receive positioning information, may transmit a message requesting position information to AP 110i and neighboring APs, as indicated by message 216. Such a request may be in the form of a ToF measurement request message, as provisioned by 802.11 standards, or any other suitable message format. As discussed above, wireless device 105 may request ToF position measurements to several APs (e.g., three APs) and because the exact positions of the APs is known, the one-way distances between wireless device 105 and the APs may be measured via ToF techniques, and location estimation techniques, such as, trilateration, may be used to converge on the location of wireless device.

In response, AP 110i or any of the neighboring APs may employ the encryption/decryption key information to encrypt the positioning information at the corresponding QoS accuracy level, as previously verified by network infrastructure 125, and forward the encrypted positioning information to wireless device 105. At this juncture, wireless device 105 may then employ the encryption/decryption key information to decrypt the encrypted positioning information and make use of the received positioning information.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

What is claimed is:

1. A secure wireless position identification system, comprising:
a plurality of access points (APs) configured to facilitate wireless communications within a servicing area;
an infrastructure entity that is communicatively coupled to each of the APs, and in operation, stores and processes subscription information, positioning information, quality of service (QoS) information indicative of resolution levels of the positioning information, and encryption/decryption information specific to each of a plurality of subscribing member wireless devices,
wherein, upon a wireless device entering the servicing area and seeking positioning information, in operation, at least one AP establishes a first level of communication with the wireless device, and receives a request for positioning information from the wireless device, and
wherein, in operation, the infrastructure entity receives the positioning information request from the at least one AP and, upon verifying that the wireless device is one of the subscribing member wireless devices and identifying the QoS level assigned to the wireless device, the QoS indicating the resolution level of the positioning information, a second level of communication is established that securely provides positioning information at the QoS level, based on the encryption/decryption information specific to the wireless device.

2. The secure wireless position identification system of claim 1, wherein the wireless device communicates with the at least one AP, based on pre-specified operational criteria.

3. The secure wireless position identification system of claim 1, wherein upon verifying that the wireless device is one of the subscribing member wireless devices, the infrastructure entity forwards the encryption/decryption information specific to the wireless device to the at least one AP.

4. The secure wireless position identification system of claim 3, wherein the infrastructure entity further forwards the encryption/decryption information specific to the wireless device to neighboring APs of the at least one AP.

5. The secure wireless position identification system of claim 3, wherein the at least one AP forwards the encryption/decryption information specific to the wireless device to neighboring APs by referring to a neighbor list mechanism.

6. The secure wireless position identification system of claim 3, wherein the at least one AP uses the encryption/decryption information specific to the wireless device to encrypt the position information at the QoS level of resolution and transmits the encrypted position information to the wireless device and the wireless devices uses the encryption/decryption information to decrypt the encrypted the position information received from the at least one AP.

7. The secure wireless position identification system of claim 1, wherein the first level of communication comprises one or more of the following operations: providing identity of the wireless device to the infrastructure entity, authenticating the wireless device by the infrastructure entity, exchanging shared authentication security keys between the infrastructure entity and the wireless device, transmitting association request by the wireless device, processing of the association request by the infrastructure entity, registering the wireless device with the infrastructure entity to establish communication connectivity, and notification of information and available services provided by infrastructure entity to the wireless device.

8. The secure wireless position identification system of claim 7, wherein the wireless device requests positioning information to the at least one AP after receiving notification that the available services includes position identification services.

9. The secure wireless position identification system of claim 1, wherein the infrastructure entity comprises one or more of the following components or a combination thereof: a database, authentication server, and positioning server.

10. The secure wireless position identification system of claim 9 wherein the verification that the wireless device is one of the subscribing member wireless devices includes examining the information contained in the database, authentication server, and/or positioning server to determine one or more of the following: whether the wireless device is a registered subscriber to the positioning services provided by the network infrastructure, whether the wireless device has satisfied the subscription criteria, whether the wireless device is current on subscription payments, what level of QoS accuracy is the wireless device entitled to based on its subscription criteria, and/or whether the current location of the wireless device is in an area where positioning information and/or accuracy levels are limited.

11. A method of securely identifying positioning information in a wireless system, the system including a plurality of access points (APs) to facilitate wireless communications within a servicing area and an infrastructure entity communicatively coupled to each of the APs, the method comprising:

storing, by the infrastructure entity, subscription information, positioning information, quality of service (QoS) information indicative of resolution levels of the positioning information, and encryption/decryption information specific to each of a plurality of subscribing member wireless devices, establishing a first level of communication with the infrastructure entity via at least one AP, by a wireless device entering the servicing area;

receiving, by the infrastructure entity, a request for positioning information request from the wireless device via the at least one AP;

processing, by the infrastructure entity, the positioning information request to verify that the wireless device is one of the subscribing member wireless devices and identify the QoS level assigned to the wireless device, the QoS level indicating the resolution level of the positioning information; and upon verifying that the wireless device is one of the subscribing member wireless devices and identifying the QoS level, establishing a second level of communication that securely provides the positioning information at the QoS level, based on the encryption/decryption information specific to the wireless device.

12. The secure method of claim 11, wherein the establishing of the first level of communication is based on pre-specified operational criteria.

13. The secure method of claim 11, wherein upon verifying that the wireless device is one of the subscribing member wireless devices, the infrastructure entity forwards the encryption/decryption information specific to the wireless device to the at least one AP.

14. The secure method of claim 13, further comprising the infrastructure entity forwarding the encryption/decryption information specific to the wireless device to neighboring APs of the at least one AP.

15. The secure method of claim 13, further comprising the at least one AP forwarding the encryption/decryption information specific to the wireless device to neighboring APs by referring to a neighbor list mechanism.

16. The secure method of claim 13, wherein the at least one AP uses the encryption/decryption information specific to the wireless device to encrypt the position information at the QoS level of resolution and transmits the encrypted position information to the wireless device and the wireless devices uses the encryption/decryption information to decrypt the encrypted the position information received from the at least one AP.

17. The secure method of claim 11, wherein the first level of communication comprises one or more of the following operations: providing identity of the wireless device to the infrastructure entity, authenticating the wireless device by the infrastructure entity, exchanging shared authentication security keys between the infrastructure entity and the wireless device, transmitting association request by the wireless device, processing of the association request by the infrastructure entity, registering the wireless device with the infrastructure entity to establish communication connectivity, and notification of information and available services provided by infrastructure entity to the wireless device.

18. The secure method of claim 17, wherein the wireless device requests positioning information to the at least one AP after receiving notification that the available services includes position identification services.

19. The secure method of claim 11, wherein the infrastructure entity comprises one or more of the following components or a combination thereof: a database, authentication server, and positioning server.

20. The secure method of claim 19, wherein the verifying that the wireless device is one of the subscribing member wireless devices includes examining the information contained in the database, authentication server, and/or positioning server to determine one or more of the following: whether the wireless device is a registered subscriber to the positioning services provided by the network infrastructure, whether the wireless device has satisfied the subscription criteria, whether the wireless device is current on subscription payments, what level of QoS accuracy is the wireless device entitled to based on its subscription criteria, and/or whether the current location of the wireless device is in an area where positioning information and/or accuracy levels are limited.

* * * * *